United States Patent Office 3,442,024
Patented May 6, 1969

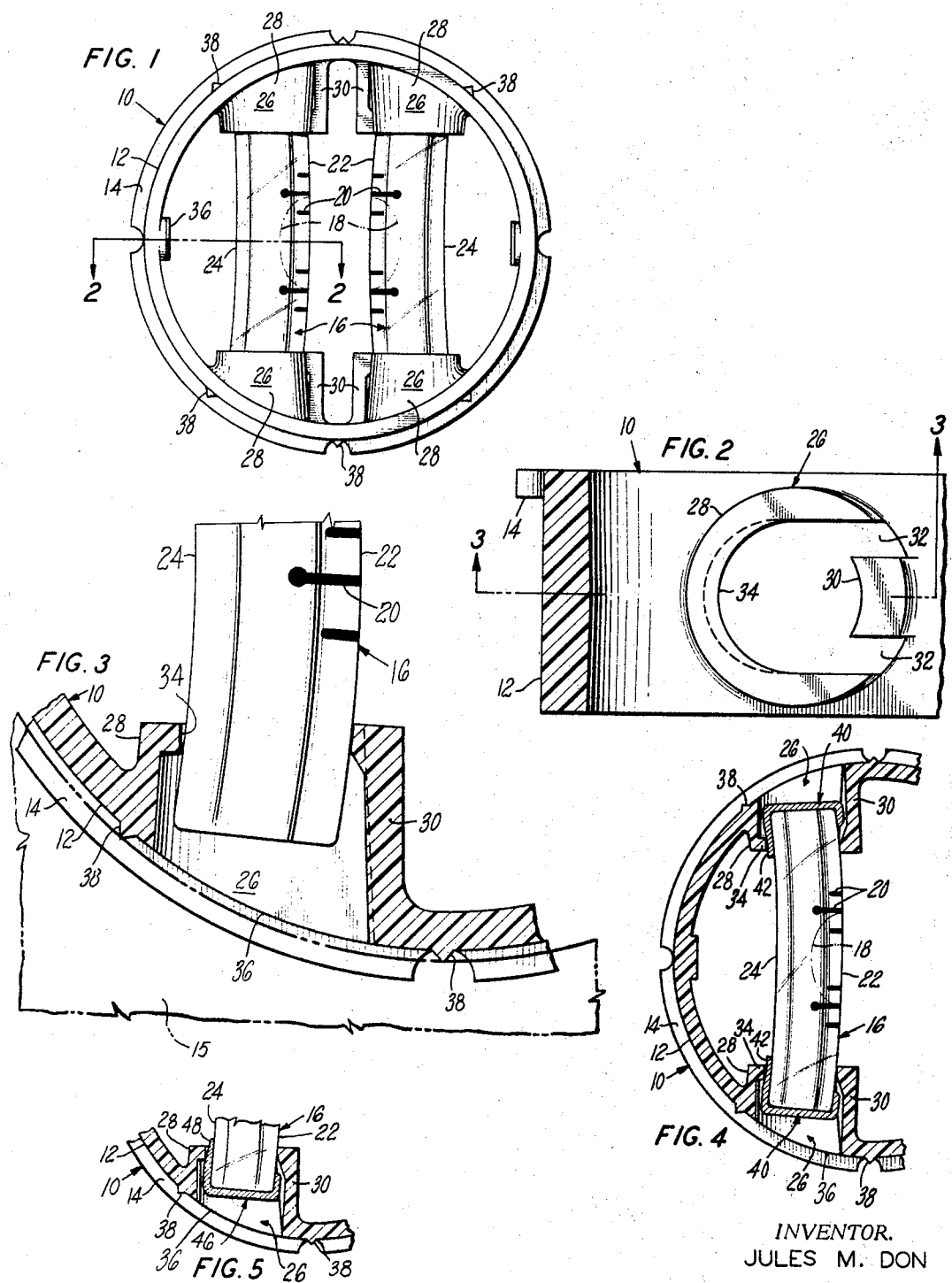

3,442,024
LEVEL VIAL HOLDER AND METHOD OF MAKING SAME
Jules M. Don, Naugatuck, Conn., assignor to The Stanley Works, New Britain, Conn., a corporation of Connecticut
Filed Dec. 28, 1966, Ser. No. 605,368
Int. Cl. G01c 9/24
U.S. Cl. 33—211                                    12 Claims

ABSTRACT OF THE DISCLOSURE

An assembly comprising a vial and a vial holder having a rim portion with generally inwardly extending openings therein providing seats for opposite end portions of the vial. The rim portion further includes a pair of resilient fingers in diametrically opposed relation to the seats and continuously urging the vial end portions into frictional engagement therewith for providing a quick and easy final adjustment of vial regulation. The final adjustment of the vial regulation is the last step according to a method of assembly of this invention wherein the vials are initially inserted in the vial holder and then the vial holder is permanently fixed in a level stock before final adjustment of the vial regulation.

---

This invention relates to mason's and carpenter's levels and the like and particularly concerns improved vial holders mountable in such levels.

A primary object of the invention is the provision of an improved vial holder assembly providing quicker and easier adjustment of a level vial in the manufacture of a level.

Another object of the invention is to provide an improved vial holder assembly which significantly facilitates the adjustment of a level vial after the assembled vial holder and level vial or vials are secured in position in a level.

A further object of the invention is to provide an improved vial holder assembly particularly suited to temporarily hold a level vial in a desired position during assembly in a level.

Still another object of the invention is to provide an improved arrangement effecting amplified correction of a level vial to a preselected adjusted position relative to a transverse axis of the vial holder.

A further object of the invention is to provide an improved method of making a level of the above described type.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawing :

FIG. 1 is a plan view of a vial holder assembly constructed in accordance with the present invention and illustrated as having a pair of level vials in assembled position in a vial holder;

FIG. 2 is an enlarged section view of the vial holder taken generally along line 2—2 of FIG. 1;

FIG. 3 is a further enlarged section view taken generally along line 3—3 of FIG. 2 illustrating a portion of the vial holder assembly of FIG. 1 positioned in a cavity of a level fragmentarily shown in phantom;

FIG. 4 is a fragmentary plan view, partly in section, of the vial holder and a vial of FIG. 1 illustrating another embodiment of an arrangement incorporated in the present invention for providing amplified correction of bubble position; and FIG. 5 is a fragmentary plan view, partly in section, of the vial holder and a vial of FIG. 1 illustrating still another embodiment of an arrangement for providing amplified correction of bubble position in accordance with the present invention.

Referring to the drawing in detail, a preferred embodiment of a vial holder 10 of the present invention is illustrated as being of unitary construction and comprising a frame 12 having at one end a flange 14 extending outwardly therefrom to facilitate its mounting in a cavity of a level 15 shown in phantom in FIG. 3. The vial holder 10 is formed of a suitable tough, resilient material such as the plastic material sold under the tradename of "Cycolac" which has been found to be satisfactory.

The frame 12 is designed to support vials of a conventional type such as the illustrated pair of curved tubular vials 16 (FIG. 1) formed of glass or other suitable transparent material for containing liquid and a level indicating bubble 18 shown in phantom. In the specific illustrated embodiment of this invention, the vials 16 are shown as being curved lengthwise end-to-end to form a high point on each vial at its middle portion having indicating marks 20 with which the bubble 18 registers when the vial 16 is brought to a horizontal position, each vial 16 having convex and concave sides 22 and 24 on opposite sides of its longitudinal axis.

Situated inside the frame 12 are a pair of tube-like seats 26 coaxially directed inwardly toward one another from the inner periphery of the frame 12 for receiving opposite ends of each vial 16. The seats 26 hold each vial 16 with its convex side 22 adjacent the center of the frame 12 such that the indicating marks 20 are disposed in proper reading position. The vial holder 10 is shown (FIG. 1) as accommodating two vials, but it will be understood that the frame 12 may be formed with only one pair of tube-like seats 26 if it is desired to employ only one vial, and the invention will be described below in connection with only one vial.

To quickly and precisely adjust the vial 16 within the vial holder 10 in accordance with the present invention, the vial 16 is supported in the vial holder 10 such that the distance between an end portion of the vial 16 and a major transverse or horizontal axis of the holder 10 may be readily changed by merely moving the vial 16 in its holder 10. It will be understood that the major transverse axis of the holder 10 shown in FIG. 1 is contained in a plane extending midway between the convex sides 22 of the vials 16. This is accomplished by providing a contact surface on either the seat 26 or the end portion of the vial 16 for engaging the other of the parts with the contact surface being disposed at an angle to the transverse axis of the holder 10. In the preferred embodiment, the above noted contact surface is formed on the end portions of the vial 16 as best seen in FIG. 3, and the seats 26 are particularly suited to accommodate vial adjustment as described more fully below.

Each tube-like seat 26 preferably comprises a U-shaped wall 28 and a resilient finger 30 overlying a closed side, or arcuate portion of the U-shaped wall 28. More specifically, the wall 28 and the finger 30 are both integrally formed with the frame 12 and project inwardly from its inner periphery. In this regard, the seats 26 are respectively split by a pair of slots 32 extending parallel to the axis of the tube-like seats 26 to form the U-shaped wall 28 and the resilient finger 30, the latter being arranged to resiliently bear against the convex side 22 of the vial 16.

To cooperate with the resilient finger 30 for effecting a gripping action on each end portion of the vial 16, a narrow rib 34 is formed on the arcuate portion of the U-shaped wall 28 at its inner end to project toward the resilient finger 30 which is diametrically opposed to the arcuate portion of the U-shaped wall 28. The inner end of each opening formed by the tube-like seat 26 is thereby slightly reduced in size (FIG. 3) and the ribs 34 provide firm bearing support for the concave side 24 of the vial 16 while the seat 26 at the same time readily provides for the vial 16 to be adjusted in position.

In assembly, the vial 16 is inserted into the vial holder 10 through openings 36 in the frame 12 to position the vial 16 in the seats 26 whereby each end portion of the vial is clamped between the wall 28 and the resilient finger 30. Thereafter bonding means is provided or a suitable adhesive, for example, is applied for permanently fixing the vial 16 in the vial holder 10. The completed vial holder assembly is then fixed as a unit in a corresponding cavity of the level 15, preferably by means of an assembly fixture (not shown) that will orient the vial holder assembly accurately in the cavity of the level 15. To assure that the vial unit will be snugly seated within the cavity of the level 15 and to also accommodate manufacturing variations occurring in the level cavity and the frame 12, a plurality of ribs 38 are shown as being formed on the outer periphery of the frame 12. Although the ribs 38 may be of any desired shape, they are shown as being of triangular cross-section and will be understood to be deformable for the purpose of firmly maintaining the vial holder assembly against movement relative to the level 15.

By virtue of the above described invention, the vial 16 may now be accurately and finally adjusted to provide proper vial regulation, and the temporary clamping action provided by the resilient fingers 30 of the seats 26 will effectively retain the vial 16 in adjusted position until the adhesive, e.g., cures to permanently bond and fix the vial 16 to the vial holder 10. Heretofore, the frame 12 of the vial holder 10 has conventionally been of annular construction to permit final adjustment of the completed vial assembly within the cavity of the level. However, it will now be apparent that the frame 12 may be of any desired shape and the vial holder 10 of this invention will still provide for the necessary measure of adjustment of the vial. In addition, it is to be noted that the described method of making a level is particularly suited for a completely automatic high speed production operation, although the final step of adjusting the vial may be desirably performed by hand.

In accordance with a modified form of the present invention, an end cap 40 (FIG. 4) is shown secured by glue or the like on the opposite end portions of the vial 16 to expedite the adjustment of the vial 16 in its assembly in the vial holder 10. The portion of each end cap 40 covering the concave side 24 of the vial 16 is provided with an outer, longitudinally extending bearing surface 42 engageable with the rib 34 of the U-shaped wall 28, the bearing surfaces 42 having a shorter radius of curvature than that of the concave side 24 of the vial 16.

As in the first embodiment, when the vial 16 is adjusted, the fingers 30 resiliently bear against the convex side 22 of the vial 16 to coact with the U-shaped walls 28 to permit movement of the vial while maintaining a gripping action thereon, and the ribs 34 engage the bearing surfaces 42 of the end caps 40. Since the end caps 40 provide bearing surfaces 42 of increasing angularity toward the ends of the vial 16 relative to its concave side 24, a given movement of the vial 16 provides a correction of bubble position which is amplified in relation to the correction which the same movement would provide were the ribs 34 in direct engagement with the vial 16.

Another embodiment of the present invention is illustrated in FIG. 5 wherein an end cap 46 includes a bearing surface 48 on the concave side 24 of the vial 16, the bearing surface 48 being of diminishing thickness formed by a straight taper in a direction away from the end of the vial 16. As in the previously described embodiment, the tapered bearing surface 48 of the end cap 46 is engageable with the ribs 34 of the U-shaped wall 28 to provide increased bubble sensitivity whereby quicker adjustment is readily obtained with less change in vial position.

As will be apparent to persons skilled in the art, various modifications and adaptations of the structure above-described will become readily apparent without departure from the spirit and scope of the invention, the scope of which is defined in the appended claims.

I claim:

1. An assembly mountable in an opening in a level and comprising a tubular vial and a vial holder having a major transverse axis, said vial holder including a rim portion having generally inwardly extending apertures therein providing a first seat and a second seat supporting a first end portion and a second end portion of said vial, said rim portion having a resilient finger in diametrically opposed relation to said first seat and continuously biased toward the same for maintaining said first end portion of said vial in frictional engagement therewith, one of said first seat and said first end portion of said vial having a surface disposed at an angle relative to said major transverse axis of said vial holder and engaging a portion of the other of said first seat and said first end portion of said vial to permit angular adjustment of the vial for varying the distance of said first end portion of said vial from said major transverse axis of said vial holder.

2. The assembly of claim 1 wherein said surface disposed at an angle relative to said major transverse axis of said vial holder is formed on said first end portion of said vial and is in substantially line contact engagement with said first seat.

3. The assembly of claim 1 wherein said first end portion and said second end portion of said vial each includes a surface formed thereon disposed at an angle relative to said major transverse axis of said vial holder.

4. The assembly of claim 1 further including bonding means for permanently securing said first end portion and said second end portion of said vial to said vial holder, said bonding means permitting ready adjustment of said vial to a preselected adjusted position before permanently securing said vial to said vial holder.

5. An assembly mountable in an opening in a level and comprising a tubular vial and a vial holder having a major transverse axis, the vial holder having a first seat and a second seat formed thereon for holding a first end portion and a second end portion of said vial, one of said first seat and said first end portion of said vial having a surface disposed at an angle relative to said major transverse axis of said vial holder and engageable with a portion of the other of said first seat and said first end portion of said vial for adjustably varying the distance of said first end portion of said vial from said major transverse axis of said vial holder, said first seat further including an end rib, and said first end portion of said vial including an end cap secured thereto and engaging said rib, said end cap forming a bearing surface generally tapering in a direction away from the end of said vial to provide amplified adjustment of said vial relative to said major transverse axis of said vial holder for a given adjusting movement of said vial in said vial holder.

6. The assembly of claim 1 wherein said rim portion of said vial holder includes a plurality of deformable ribs formed on an outer periphery thereof and suitably dimensioned to seat said vial holder in interference fitting relation within an opening of a level.

7. The assembly of claim 1 wherein said first seat includes an arcuate portion, said resilient finger and said arcuate portion of said first seat respectively engaging opposite sides of said first end portion of said vial thereby to grip the same and support it in a preselected adjusted position in said vial holder.

8. The assembly of claim 1 wherein said vial is curved lengthwise with opposed, longitudinally extending concave and convex sides, wherein an additional resilient finger is provided for said second seat, and wherein said first and second seats of said vial holder are each correspondingly split by a pair of slots extending in an axial direction and forming for each seat a U-shaped wall member and its respective resilient finger member overlying a closed arcuate side of said U-shaped wall member, said wall and finger members defining an opening in each seat for receiving and gripping an end portion of said vial, and said finger members resiliently engaging said first and second end portions of said convex side thereof.

9. The assembly of claim 7 wherein said first seat includes a U-shaped wall in spaced opposed relation to said finger and forming said arcuate portion of said first seat, said U-shaped wall having an end rib projecting toward said finger thereby to form a tube-like seat for receiving said first end portion of said vial.

10. The assembly of claim 8 wherein each of said first and second seats includes a rib formed on an inner end of each of said U-shaped wall members, said ribs being diametrically opposed to a gripping portion of said finger members of their respective seats and projecting toward said finger members to provide a bearing surface engaging said end portions of said vial on said concave side thereof.

11. A method of making a level comprising the steps of temporarily positioning a generally tubular vial in a vial holder having a major transverse axis, fixing the assembled vial and vial holder in an opening of a level with the vial holder being permanently secured in a predetermined position oriented with respect to the level, and finally adjusting the vial to a preselected position relative to the level and a major transverse axis of the vial holder.

12. The method of claim 11 further including the step of providing bonding means in the vial holder for permanently securing the vial in its preselected adjusted position.

References Cited

UNITED STATES PATENTS

| | | | |
|---|---|---|---|
| 2,453,091 | 11/1948 | Holloway et al. | 33—213 |
| 2,495,646 | 1/1950 | Schultes | 33—211 |
| 2,502,235 | 3/1950 | Schultes | 33—213 |

FOREIGN PATENTS

| | | |
|---|---|---|
| 483,930 | 1938 | England. |

WILLIAM D. MARTIN, Jr., *Primary Examiner.*